US012808694B1

(12) United States Patent
Lam et al.

(10) Patent No.: US 12,808,694 B1
(45) Date of Patent: Nov. 24, 2026

(54) BEAM SHAPING USING METALENS FOR BEAM TRACKING AND FIBER COUPLING

(71) Applicant: NORTHROP GRUMMAN SYSTEMS CORPORATION, Falls Church, VA (US)

(72) Inventors: Daniel W. Lam, Gardena, CA (US); Arthur B. O'Connor, Tuscon, AZ (US); James M. Zamel, Rolling Hills Estates, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 224 days.

(21) Appl. No.: 18/798,287

(22) Filed: Aug. 8, 2024

(51) Int. Cl.
*G01D 5/30* (2006.01)

(52) U.S. Cl.
CPC .................................... *G01D 5/305* (2013.01)

(58) Field of Classification Search
CPC ...................................................... G01D 5/305
USPC .......................................................... 398/202
See application file for complete search history.

(56) References Cited

U.S. PATENT DOCUMENTS 10,389,442 B2 * 8/2019 Graves .................. H04B 10/11
10,473,439 B2 * 11/2019 Bortz ......................... F41J 5/02
12,659,069 B2 * 6/2026 Roberts ................... H04J 14/07
2011/0089314 A1 * 4/2011 Yang .................... G02B 6/4207
250/227.2
2017/0052334 A1 * 2/2017 Graves ............... H04B 10/1123
2018/0014851 A1 * 1/2018 Hansen .............. A61B 17/3421
2022/0045753 A1 2/2022 Coward et al.

FOREIGN PATENT DOCUMENTS

GB 2430818 A * 4/2007 ............ H03M 1/308
WO WO-2015116730 A1 * 8/2015 ......... H04B 10/1125

OTHER PUBLICATIONS

Li et al; Achromatic Flat Metasurface fiber Couplers within Telecom bands; Dec. 2022, MDPI Photonics, pp. 1-8. (Year: 2022).*
Liu et al; Ultracompact meta lens-based bean focusing fiber-optic device with a large numerical aperture; Mar. 2023; Optics Letters vol. 48, No. 7, pp. 1-4. (Year: 2023).*
Gi-Hyun Go et al, Scannable Dual-Focus Metalens with Hybrid Phase, NANO Letters, 2023, pp. 3152-3158, 53, https://pubs.acs.org/doi/pdf/10.1021/acs.nanolett.2c04696.
C. Williams, Y. Montelongo, T. D. Wilkinson, Advanced Optical Materials 2017, 5, 1700811. https://doi.org/10.1002/adom.201700811.

* cited by examiner

*Primary Examiner* — Amritbir K Sandhu
(74) *Attorney, Agent, or Firm* — John A. Miller; Shumaker, Loop & Kendrick, LLP

(57) ABSTRACT

An optical sensor assembly including a metalens responsive to an optical input beam, where the metalens is configured to shape the optical input beam to provide a center beam and an outer ring beam. The sensor assembly also includes a beam tracking sensor responsive to the shaped input beam from the metalens, where the sensor has an opening. The sensor assembly further includes a fiber positioned within the opening so that an input facet of the fiber faces the metalens. The sensor is positioned relative to the metalens and the position of the input beam is controlled so that the center beam impinges the input facet and the ring beam impinges the sensor.

20 Claims, 1 Drawing Sheet

FIG. 1
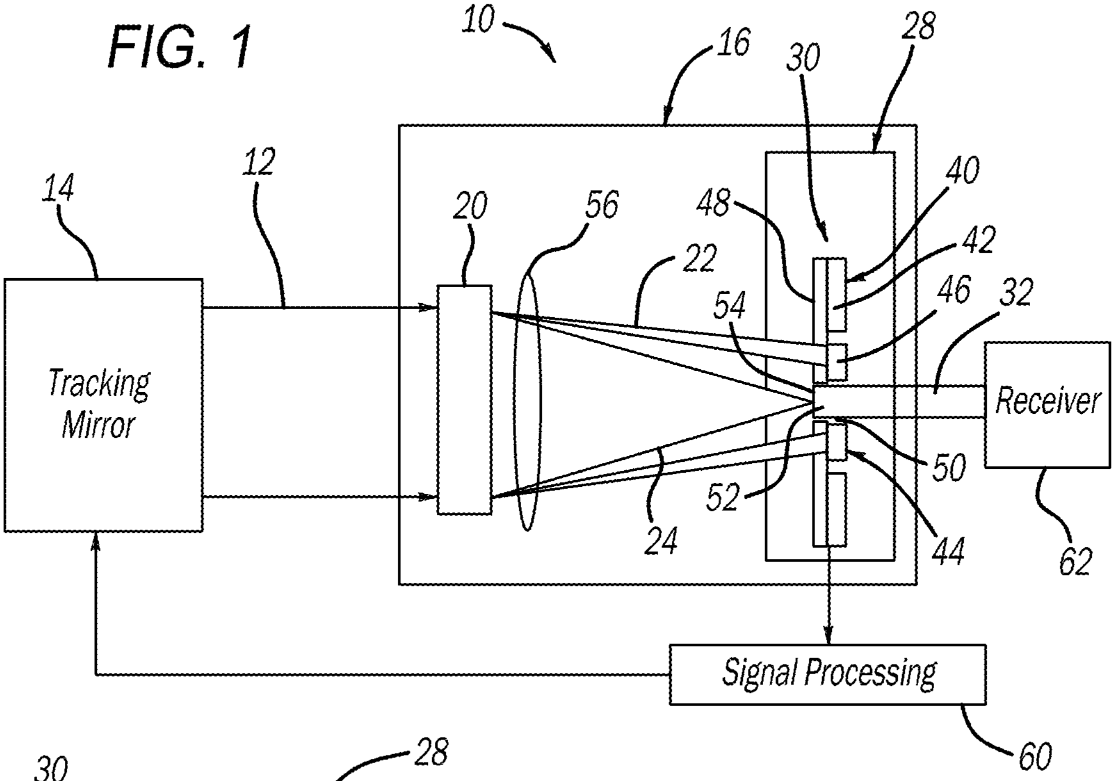
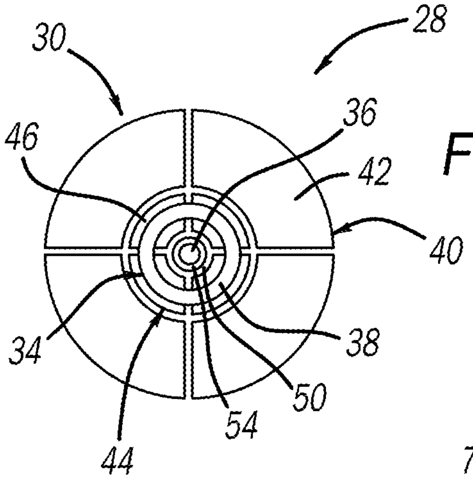
FIG. 2
FIG. 3
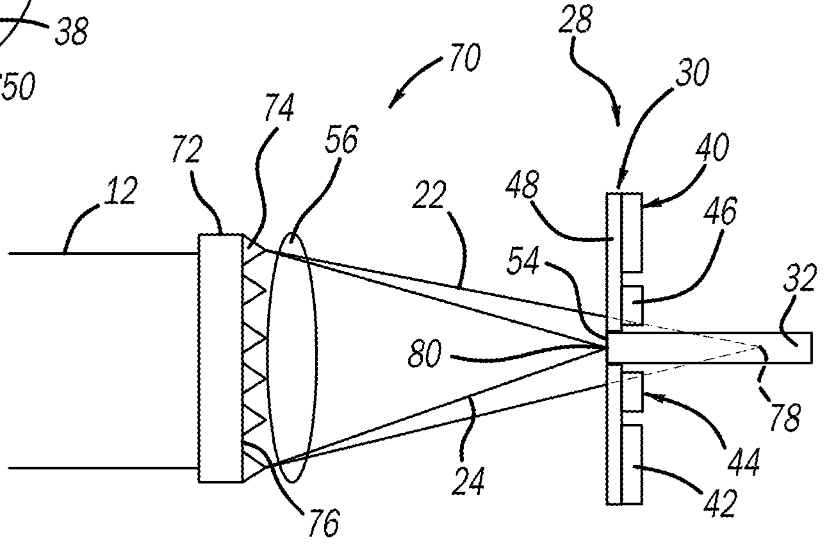

BEAM SHAPING USING METALENS FOR BEAM TRACKING AND FIBER COUPLING

BACKGROUND

Field

This disclosure relates generally to an optical sensor and, more particularly, to an optical sensor module including a metalens that directs an optical beam onto a hybrid sensor assembly having a tracking sensor and a fiber.

Discussion of the Related Art

Optical or laser communications systems transmit optical signals that contain data and other information between communications terminals on a communications link. These terminals can be ground-based terminals or on any suitable platform, such as satellites, aircraft, ships, etc. Optical communications systems typically employ two separate optical paths one for beam acquisition and tracking and one for fiber coupling for information processing, which typically requires two fast steering mechanisms with tight tolerances for beam alignment. There is a need to make these optical systems smaller, lighter and less costly.

Optical metamaterials are artificially engineered materials that have optical properties that are a function of the material's native optical property (refractive index), sub-wavelength unit cell element motif, properties of the incident light, such as its incidence angle and polarization, and the configuration of its unit cells (periodic/aperiodic) rather than just the material's native chemical composition (refractive index). 2-D metamaterials, also known as metasurfaces, can be designed and fabricated as structural units to achieve desired diffractive optical properties and functionalities, such as focusing light with low loss, where such metasurfaces are sometimes referred to as metalenses.

Metasurfaces or metalenses are ultra-thin flat optics that can be fabricated for visible and IR imaging. The unit cells or meta-atoms for these metalenses may include motifs such as pillars, holes, rings, crosses, etc. on the order of $\lambda_0/4$ in size periodically arranged on a transparent or reflective substrate, where the planar optic out of plane dimension can be on the order of Ao, but could be smaller if the material index is large. The ability to fabricate optical quality wide-band flat metalenses and metamirrors (reflective elements) with good achromatic performance using conventional micro/nano-electronic fabrication techniques has been demonstrated in the art.

BRIEF DESCRIPTION OF THE DRAWINGS

FIG. 1 is an illustration of an optical communications terminal including a hybrid sensor module having a metalens that directs an optical beam onto a hybrid sensor assembly including a tracking sensor and a fiber;

FIG. 2 is a front view of the hybrid sensor assembly separated from the optical communications terminal; and FIG. 3 is an illustration of a hybrid sensor module that employs a diffractive optical element (DOE).

DETAILED DESCRIPTION OF THE EMBODIMENTS

The following discussion of the embodiments of the disclosure directed to an optical sensor module including a metalens that directs an optical beam onto a hybrid sensor assembly including a tracking sensor and a fiber is merely exemplary in nature, and is in no way intended to limit the disclosure or its applications or uses. For example, the discussion herein talks about the disclosed sensor module being used in connection with an optical communications terminal. However, the sensor module may have other applications.

As will be discussed in detail below, this disclosure describes an optical sensor assembly that includes a metalens or a DOE that shapes, focusses and directs an optical beam, a tracking sensor that receives the shaped optical beam and a single-mode fiber positioned at the center of the tracking sensor. The metalens or DOE manipulates the phase of the optical beam and is designed to create a beam shape similar to a bulls-eye pattern having a center beam and an outer ring beam. The center beam optically couples light into the single-mode fiber and the ring beam optically couples light onto the tracking sensor to track the incoming optical beam. As the beam is tracked and centered, the optical power coupled into the fiber is maximized.

The disclosed optical sensor assembly provides a number of advantages. These include combining capabilities to do both tracking and fiber coupling into a single-mode fiber, removing the necessity to co-align the fiber to the tracking sensor, and the tracking sensor and the fiber are co-axial and have no introduced alignment error. The benefit of this is that it makes for a more robust alignment and being co-axial also greatly reduces the influence of structural and thermal distortions since they are co-located. In practice, the sensor assembly helps to eliminate additional components used in conjunction with known sensor assemblies. When there are two separate optical paths, two tracking mechanisms are required one to help control the track of the beam and one for optimizing fiber coupling. Because the paths are combined, one of the tracking mechanisms can be eliminated, which simplifies the algorithms and electronics, reduces software, reduces overall cost, and reduces the alignment and assembly time. Reducing one of the tracking mechanisms also reduces optical components (size, weight, cost) and any structural and thermal influence on the larger structure. The sensor assembly is smaller and more optically and electrically power efficient compared to using two optical paths. The metalens can be designed to provide an extra layer of filtering by designing it with narrowband and polarization-dependent properties.

FIG. 1 is an illustration of an optical communications terminal 10 that receives an optical communications laser beam 12 at a suitable wavelength from a tracking mirror 14 and directs the beam 12 into a hybrid sensor module 16 including a metalens 20 that receives the beam 12. The metalens 20 includes sub-wavelength elements, such as posts, pillars, columns, etc., that shape the beam 12, where the sub-wavelength elements are typically etched onto a surface of a suitable semiconductor substrate in a manner well understood by those skilled in the art. The wavelength of the beam 12 and the configuration, spacing, size, etc. of the sub-wavelength elements determine how the beam 12 is shaped. The metalens 20 is designed to shape the beam 12 through diffraction to generate a tracking beam 22 and a signal beam 24 that contains most of the beam power, where the beams 22 and 24 form a bulls-eye type beam pattern discussed in further detail below.

The sensor module 16 also includes a hybrid sensor assembly 28 having a circular tracking sensor 30 that receives the tracking beam 22 and a single-mode fiber 32 that receives the signal beam 24. FIG. 2 is a front view of the hybrid sensor assembly 28 separated from the terminal 10 showing a bulls-eye beam pattern 34 including a center beam spot 36 created by the signal beam 24 and an outer beam ring 38 created by the tracking beam 22. The size and radius of the beam ring 38 and the size of the beam spot 36 are fixed and are determined by the wavelength of the beam 12 and the configuration of the metalens 20. Those parameters can be adjusted from module to module for different applications. Further, the amount of relative beam power provided in the tracking beam 22 and the signal beam 24 can also be adjusted.

In this non-limiting embodiment, the tracking sensor 30 is a nested quad-cell type sensor, however, other types of sensors, such as focal plane arrays, are applicable for the purposes discussed herein. The tracking sensor 30 can be any photo-type detector, such as an InGaAs detector, that converts photons to electrical signals in any suitable manner depending on the wavelength of the beam 12. In this non-limiting embodiment, the tracking sensor 30 includes an outer ring 40 having four sensor elements 42, one in each quadrant, and an inner ring 44 having four sensor elements 46, one in each quadrant, all formed and mounted on a common substrate 48. The outer ring 40 of the sensor elements 42 provides rough beam acquisition and tracking, and the inner ring 44 of the sensor elements 46 provides track fine tuning. The tracking sensor 30 includes a central opening 50 that accepts a tip 52 of the fiber 32, where the fiber 32 includes an input facet 54 that faces the metalens 20 and receives the signal beam 24. The sensor module 16 may include a refractive lens 56 or other optic that helps focus the tracking beam 22 and the signal beam 24 onto the hybrid sensor 28 in the manner described.

The tracking sensor 30 is a beam position detecting sensor that acquires and positions the tracking beam 22. FIG. 2 shows the bulls-eye beam pattern 34 properly positioned after the tracking beam 22 is centered on the sensor 30 and the signal beam 24 impinges the facet 54. Prior to that, the bulls-eye pattern 34 needs to be centered. Each of the sensor elements 42 and 46 provides output voltages to a signal processor 60 that identifies the location of the beam 22 on the sensor 30, where the higher the voltage the more optical power the element 42 and 46 is receiving. The signal processor 60 controls the tracking mirror 14 so that the tracking beam 22 does not impinge the elements 42 so that the beam 22 is directed onto only the inner ring 44. The tracking mirror 14 is further controlled through fine tuning so that all of the output voltages from the sensor elements 46 are the same, which occurs when the signal beam 24 is centered on the input facet 54 of the fiber 32. The signal beam 24 that carries the information is sent down the fiber 32 to a receiver 62 that converts the signal beam 24 to an electrical signal and then to a digital signal for processing depending on the application.

FIG. 3 is an illustration of a hybrid sensor module 70 showing an alternate embodiment, where like elements to the sensor module 16 are represented by the same reference number. In this embodiment, the lens 56 may be required. The sensor module 70 includes a DOE 72 instead of the metalens 20 to generate the tracking beam 22 and the signal beam 24. The DOE 72 includes a diffraction grating 74 having grooves 76 at sub-wavelength spacing that operate to bend or diffract light in a desired manner and create multiple focal lengths. The diffracted beam 12 from the DOE 72 is focused by the lens 56 to provide two beams, the tracking beam 22 and the signal beam 24, focused at different focal points 78 and 80, respectively. The hybrid sensor 28 is positioned so that the facet 54 of the fiber 32 is at the focal point 80 of the beam 24 and the focal point 78 of the beam 22 is behind the tracking sensor 30. Because the focal point 78 is behind the sensor 30, the light in the beam 22 is circular when it impinges the sensor 30, thus creating the bulls-eye pattern 34 of the beams 22 and 24 as shown in FIG. 2.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An optical sensor assembly comprising:

a metalens responsive to an optical input beam, said metalens being configured to shape the optical input beam to provide a center beam and an outer ring beam that are spaced apart from each other and form a bullseye pattern;

a sensor responsive to the shaped optical input beam from the metalens, said sensor having an opening; and a fiber positioned within the opening so that an input facet of the fiber faces the metalens, wherein the sensor is positioned relative to the metalens and the position of the optical input beam is controlled so that the center beam impinges the input facet and the ring beam impinges the sensor.

2. The sensor assembly according to claim 1 wherein the sensor is circular and the opening is at a center of the sensor.

3. The sensor assembly according to claim 1 wherein the sensor includes an outer ring having a plurality of spaced apart sensor elements, and an inner ring positioned within the outer ring and having a plurality of spaced apart sensor elements.

4. The sensor assembly according to claim 3 wherein the plurality of sensor elements in both the inner and outer rings is four sensor elements, where a sensor element is provided in each quadrant of the ring.

5. The sensor assembly according to claim 1 wherein the sensor provides signals for optical input beam tracking.

6. The sensor assembly according to claim 1 wherein the sensor assembly is part of an optical communications terminal.

7. The sensor assembly according to claim 1 further comprising a refractive optical element positioned between the metalens and the sensor, said refractive optical element focusing the shaped input beam.

8. The sensor assembly according to claim 1 wherein the center beam includes most of the beam power of the optical input beam.

9. An optical sensor assembly comprising:

a metalens responsive to an optical input beam, said metalens being configured to shape the optical input beam to provide a center beam and an outer ring beam;

a circular tracking sensor responsive to the shaped optical input beam from the metalens, said sensor including an outer ring having a plurality of spaced apart sensor elements and an inner ring positioned within the outer ring and having a plurality of spaced apart sensor elements, said sensor having an opening; and a fiber positioned within the opening so that an input facet of the fiber faces the metalens, wherein the sensor is positioned relative to the metalens and the position of the optical input beam is controlled so that the center beam impinges the input facet and the ring beam impinges the sensor, said sensor providing signals for optical input beam tracking.

10. The sensor assembly according to claim 9 wherein the plurality of sensor elements in both the inner and outer rings is four sensor elements, where a sensor element is provided in each quadrant of the ring.

11. The sensor assembly according to claim 9 wherein the sensor assembly is part of an optical communications terminal.

12. The sensor assembly according to claim 9 further comprising a refractive optical element positioned between the metalens and the sensor, said refractive optical element focusing the shaped input beam.

13. The sensor assembly according to claim 9 wherein the center beam includes most of the beam power of the optical input beam.

14. A method for detecting an optical input beam, said method comprising:

directing the optical input beam through a metalens, said metalens being configured to shape the optical input beam to provide a center beam and an outer ring beam that are spaced apart from each other and form a bullseye pattern;

directing the shaped optical input beam from the metalens to a sensor, said sensor having an opening;

positioning the sensor relative to the metalens; and controlling the position of the optical input beam so that the center beam impinges an input facet facing the metalens of a fiber positioned within the opening and the ring beam impinges the sensor.

15. The method according to claim 14 wherein the sensor is circular and the opening is at a center of the sensor.

16. The method according to claim 14 wherein the sensor includes an outer ring having a plurality of spaced apart sensor elements, and an inner ring positioned within the outer ring and having a plurality of spaced apart sensor elements.

17. The method according to claim 16 wherein the plurality of sensor elements in both the inner and outer rings is four sensor elements, where a sensor element is provided in each quadrant of the ring.

18. The method according to claim 14 wherein the sensor provides signals for optical input beam tracking.

19. The method according to claim 14 wherein the method is employed in an optical communications terminal.

20. The method according to claim 14 further comprising directing the shaped optical input beam from the metalens through a refractive optical element positioned between the metalens and the sensor so as to focus the shaped input beam.

* * * * *